United States Patent [19]

Heitmann

[11] 4,048,137

[45] Sept. 13, 1977

[54] ELASTOMERIC MATERIALS REINFORCED WITH SMALL DIAMETER GLASS FIBERS

[75] Inventor: Glenn Alvin Heitmann, Morrison, Colo.

[73] Assignee: Johns-Manville Corporation, Denver, Colo.

[21] Appl. No.: 712,616

[22] Filed: Aug. 9, 1976

Related U.S. Application Data

[63] Continuation-in-part of Ser. No. 629,200, Nov. 5, 1975, abandoned.

[51] Int. Cl.$^2$ .............................................. C08K 7/14
[52] U.S. Cl. .............................. 260/42.15; 260/42.18; 260/756; 260/762
[58] Field of Search ................. 260/42.15, 42.18, 756, 260/762

[56] References Cited

U.S. PATENT DOCUMENTS

| 3,350,345 | 10/1967 | Vanderbilt et al. | 260/42.15 |
| 3,556,844 | 1/1971 | Marzocchi | 260/42.18 |
| 3,746,669 | 7/1973 | Dunnom | 260/42.18 |
| 3,915,928 | 10/1975 | Leibu | 260/42.18 |

FOREIGN PATENT DOCUMENTS

| 676,324 | 12/1963 | Canada | 260/42.18 |

OTHER PUBLICATIONS

Modern Plastics Encyclopedia 1967, Sept. 1966, No. 1A, vol. 44, p. 599.

Oleesky et al., Handbook of Reinforced Plastics, Reinhold Pub. Corp., New York, 1964, p. 129.

*Primary Examiner*—James H. Derrington
*Attorney, Agent, or Firm*—Robert M. Krone; Joseph J. Kelly; James W. McClain

[57] ABSTRACT

Elastomeric materials reinforced with short small diameter insulating glass fibers are disclosed. The elastomeric materials may be any of a variety of natural or synthetic rubbers or rubber-like elastomers. The glass fibers are those commonly designated AAA through B diameters (0.5 to 3.8 microns) and have lengths of from about 3 mm to about 50 mm. Whereas the large diameter fibers commonly considered to be "reinforcing fibers" have been found not to provide satisfactory reinforcement to elastomers, it has now been unexpectedly discovered that the very small diameter insulating fibers, previously believed not to be satisfactory for reinforcement purposes, do in fact provide excellent reinforcement to elastomers. Similarly, it has now been found that short individual fibers, loose or in wool form, can be used for reinforcement instead of the long strands and bundles of continuous glass filaments and woven glass fabrics heretofore relied on by the art. The reinforcement properties of the short small diameter fibers may be significantly enhanced by the presence of carbon black in the elastomer compound. The elastomeric materials reinforced in accordance with the present invention, with or without the carbon black component, find use in various heated and molded rubber products, such as gaskets, tire treads, sheet packings and the like.

13 Claims, No Drawings

ELASTOMERIC MATERIALS REINFORCED WITH SMALL DIAMETER GLASS FIBERS

CROSS-REFERENCE TO RELATED APPLICATION

This Application is a continuation-in-part of Application Ser. No. 629,200 filed Nov. 5, 1975, now abandoned.

BACKGROUND OF THE INVENTION

The invention herein relates to fiber reinforced elastomeric materials. More particularly, it relates to rubber and rubber-like natural and synthetic elastomeric compositions reinforced with very small diameter glass fibers. The elastomeric materials reinforced in accordance with the present invention find use in various heated and moulded rubber products, such as gaskets, tire treads, sheet packings and the like.

It has heretofore been well known to use certain types of glass fibers as reinforcement for various plastic and rubber compounds. For instance, a number of patents which describe various rubber compounds to be used for sheet packing mention that the rubber can be reinforced by any of a variety of fibrous materials, such as asbestos and glass fiber. Also, various patents describe the use of strands or bundles of continuous glass fiber filaments for reinforcement of tires. In addition, the use of woven glass matts, fabrics and yarns for reinforcement of elastomers has been described. Heretofore, however, the short glass fibers of small diameter which comprise loose or "bulk" fiber or blown thermal insulating wool have not been considered suitable for reinforcement purposes for elastomers.

Similarly, there are few references to the use of fine diameter fibers as elastomer reinforcements. U.S. Pat. No. 3,556,844 shows continuous strand of glass fiber of 0.0001 to 0.0015 inch (2.5 to 38 microns) but does not deal with the use of short fibers.

While common reinforcing grades of short glass fibers have been successfully used to reinforce various types of thermoplastic and thermosetting resins, their use for elastomer reinforcement has been less widespread and considerably less successful. Such short "reinforcing" fibers are commonly considered to be the coarse D through U grades, which have fiber diameters of 0.0002 to 0.001 inch (5.1 to 25.4 microns). While the exact reasons for the relatively unsatisfactory performance of "reinforcing" glass fibers in elastomers are not precisely known, it has been observed that there is significant deterioration in properties with the use of ordinary glass fiber in the compounds. While certain properties, such as elongation, would be expected to be reduced because the inelastic glass fibers inhibit the stretching of the elastomer, it would normally be expected that such reduction and elongation would also be accompanied by a corresponding increase in tensile strength. Observations, however, have shown that such increase in tensile strength is not achieved in most cases, and where there is an increase it is not of a magnitude which would indicate that the short coarse glass fibers were in fact providing a satisfactory level of reinforcement. In short, therefore, the conventional short coarse "reinforcing" glass fibers have been found not to provide adequate reinforcement for elastomers as compared to materials such as asbestos fiber. Neither can they be considered to be functioning as fillers, for unlike conventional fillers such as carbon black the fibers cause serious deterioration in properties such as elongation without a concomitant increase in other properties.

In addition, there is believed to be a surface area factor involved in the adhesion of glass fiber to elastomers. For example, a unit weight of grade B glass fiber has approximately 80% more surface area than an equivalent unit weight of grade D fiber, and the disparity increases rapidly as larger fiber diameter grades are considered.

Various fiber lengths and diameters have been suggested for reinforcement of plastics. However, plastics and elastomers are of significantly different physical and chemical nature, and therefore, as noted above, teachings relating to plastics reinforcement have not normally been applicable to elastomer reinforcement. See, for instance, *ASTM Special Technical Publication No.* 184 (1956); Dannis, *Rubber Age*, pp 35–44 (July, 1975); and Rondeau, *Machine Design*, pp 154–163 (July 21, 1966).

BRIEF SUMMARY OF THE INVENTION

The invention herein resides in the unexpected and surprising discovery that elastomers can be combined with very fine short glass fibers to produce reinforced elastomeric compositions having properties equivalent to or better than the properties of equivalent elastomeric materials reinforced with asbestos fibers, and significantly better than the properties of elastomeric materials reinforced with the conventional large diameter "reinforcing" glass fibers. In addition, such compositions can be much more readily formed and used than prior art compositions containing continuous strand or woven fabrics and the like long-fiber containing materials. Therefore, included within the scope of the present invention is an elastomeric composition comprising a natural or synthetic rubber matrix reinforced by 5 to 150 phr, preferably 5 to 50 phr, of fine short glass fibers, the glass fibers having diameters in the range of from 0.5 to 3.8 microns and lengths of about 3 to 50 mm (about 0.12 to 2.0 inches). (As used herein, "phr" is defined to stand for parts by weight of the specified component per 100 parts by weight of the natural or synthetic rubber matrix.) The glass fibers may be in the form of loose fibers but it is more convenient to mix the fibers in the form of glass wool with the elastomer and then let the wool fibers be broken down during milling of the wool into the elastomer.

Also included within the scope of the present invention is the discovery that the fine diameter short glass fibers create a synergistic effect when incorporated into elastomeric materials along with carbon black. The resultant products are found to be very strong, particularly when compared to similar products reinforced with conventional large diameter glass fibers and/or asbestos fibers.

DETAILED DESCRIPTION AND PREFERRED EMBODIMENTS

The gist of the present invention lies in the discovery that very fine diameter short glass fibers, which have heretofore been considered merely as insulation fibers without any significant reinforcing value, can be incorporated into elastomeric compounds and provide significant and improved reinforcement to the synthetic and/or natural rubber matrix. This good reinforcing effect is even the more surprising when considered against the prior art background that has shown conventional short coarse glass fibers or continuous or similar long glass fibers normally used as reinforcements to have very little if any reinforcing effect and indeed to be greatly inferior to fibers such as asbestos fibers in reinforcing elastomers.

The elastomeric natural and synthetic rubbers and rubber-like materials which can be reinforced by the fine diameter fibers of the present invention include natural rubbers, styrene-butadiene (SBR) rubbers, butyl rubbers, ethylene-propylene (EP) rubbers, synthetic polyisoprene rubbers, polybutadiene rubbers, acrylonitrile-butadiene (nitrile rubbers, polychloroprene (neoprene) rubbers, fluoroelastomer rubbers, and ethylene-propylene-diene (EPDM) rubbers. All of these families of synthetic or natural rubbers and rubber-like materials are well known and their various properties and chemical compositions are widely published; see e.g., *The Vanderbilt Rubber Handbook* (Winspear, ed.; 1968). While the reinforcing effect of the fine diameter short glass fibers of the present invention will be somewhat different in each of the various natural or synthetic rubbers, a significant reinforcing effect will be found with all.

The "fine diameter short glass fibers" as utilized in the present invention are those glass fibers having dimeters in the range of 0.5 to 3.8 microns (0.00002 through 0.00015 inches) and lengths of about 3 to 50 mm (about 0.12 to 2.0 inches). These are normally referred to as being AAA through B diameter fibers, with B being the largest diameter fibers. The B diameter fibers (2.5 to 3.8 microns; 0.00010 to 0.00015 inch) are preferred, for they are the most readily fabricated and are also usually the most economical. The individual lengths and distribution of lengths will largely be determined by the type of process from which the fiber is formed. The fibers may be present as individual loose or bulk fibers or may be present as "wool". In the various glass wools the fibers are massed together in bulky lightweight batts, which range in density from 0.5 to 5 pounds per cubic foot (0.008 to 0.08 g/cm$^3$) and a thickness of from about $\frac{3}{8}$ inch up to about 6 inches (0.95 to 15.2 cm). Such batts are normally considered to be solely insulating materials and are used as such in the trade. A part of the present invention, however, is the discovery that such batts can be used directly for reinforcing of elastomeric materials. While in the wool batts the fiber lengths may be somewhat greater than 50 mm (2.0 inches) in the original batt, milling of the batt into the elastomer will break down essentially all fibers into lengths within the aforesaid 3 mm to 50 mm (0.12 to 2.0 inches) range.

The particular chemical composition of the glass used to form the fibers is not critical to the present invention. Various types of compositions, including the well known A, C and/or E glasses may be used. Ordinarily the glass will have no additives, coatings, binding agents or similar materials on its surface. In order to promote a more thorough bonding of the glass fiber surface to the elastomeric material it is therefore preferred to add a coupling agent, preferably a silane type, to the glass, in the amount of from 0.25% to 3%, preferably 0.5% to 1.0% by weight of glass fiber. Various organosilanes are well known as coupling agents in the glass fiber art and their structure and use need not be detailed here. Typical of those which have been found satisfactory are gamm-methacryloxypropyltrimethoxysilane, and gamma-mercaptopropyltrimethoxysilane; the first is particularly useful for coupling to elastomers which have been cured with peroxides and the latter for coupling with elastomers which have been cured with sulfur.

The glass fiber in the present invention will be present in the elastomeric matrix in a concentration of from 5 to 150 phr, perferably 5 to 50 phr.

It has also been found that the use of the fine diameter short glass fibers in the present invention produces a significantly superior product when carbon black is also present in the mixture with the elastomer in glass fiber. As will be noted below, very marked improvement in properties, particularly the strength properties, are found by the synergistic combination of the fine diameter short glass fiber and the carbon black. A variety of different types of carbon blacks can be use. Nomenclature and typical physical properties for standard carbon blacks will be found in ASTM Specifications Nos. D-1765 and D-2516. Excellent products have been made using FEF type carbon blacks with typical particle sizes in the range of 40 to 48 nanometers.

The carbon black will be present as 5 to 75 phr, preferably 5 to 35 phr.

The compositions and articles of this invention can be readily fabricated using conventional rubber milling devices. Excellent samples have been made using a Banbury milling machine. The rubber is placed in the machine in the conventional manner and the glass fiber may be added in any convenient manner. One which has been found entirely satisfactory is to simply add the glass as batts of glass wool. The carbon black may be added by direct mixing in the rubber mill. The silanes can be applied to the glass directly, as by roller coating or spraying, or simply added directly to the mixture of materials in the rubber mill.

The following data and examples will illustrate the superiority of the present invention over conventional glass fiber and reinforced fiber elastomers. In each case the "chopped strands" were conventional chopped strands of reinforcing glass fiber having a nominal length of $\frac{1}{4}$ inch (6.3 mm) and a fiber diameter of approximately 13 microns (classed as K fiber). Runs utilizing chopped strands are designated by the letter "CS". The fine diameter fibers for comparison were in the form of glass wool and were fibers of 2.5 to 3.8 microns diameter (classed as B fiber). Milling of the wool into the elastomer breaks down the fiber lengths to lengths comparable to the nominal length of the comparison "chopped strand." Runs utilizing the glass wool are designated by the initials "BW" signifying "B glass wool". Other notations are defined below. Carbon black where used was a typical type FEF carbon black. Except where noted the rubber used was a conventional styrene-butadiene (SBR) rubber. The various chopped strands normally had conventional glass sizings including silanes present on their surfaces. The "B wool" fine diameter short fibers used had nothing on their surfaces other than the aforementioned gamma-mercaptopropyltrimethoxysilane, except where noted. Compositions were formed in a laboratory Banbury mixer under standard rubber milling conditions. Properties were measured according to the following standard tests:

| | |
|---|---|
| Shore "A" hardness | ASTM D-2240 |
| Elongation | ASTM D-412 (Die C) |
| Tensile strength | ASTM D-412 (Die C) |
| Tensile modulus | |
| at 100% elongation | ASTM D-412 (Die C) |
| at 300% elongation | ASTM D-412 (Die C) |
| Tear strength | ASTM D-624 (Die B) |

Modulus of compression was determined by forming cylinders of the materials to be tested 1⅛ inch (28.6 mm) in diameter and ½ inch (12.7 mm) thick from strips ⅝ inch (15.9 mm) wide and 1/32 inch (0.8 mm) thick. The cylinders were vulcanized for 15 minutes in the presence of 90 psig steam (308° F; 153° C). The fiber orientation was axial in the cylinders. The cylinder samples were taken compressed in an Instron test machine at the rate of 0.2 inch (5.1 mm) per minute. The modulus of compression for each was then taken as the initial shape of a plotted curve of compressive force versus time.

Table I below illustrates direct comparisons between SBR rubber (1) filled with chopped strand glass fiber and (2) reinforced with the B wool of the present invention. The run designated "BW-0" is a run in which the fine diameter short glass fibers were used without any silane so as to provide a direct comparison between the dry B wool and the coppped strands.

TABLE I

| Run No. | CS-1 | CS-2 | CS-3 | CS-4 | CS-5 | BW-0 | BW-1 | BW-2 | BW-3 | BW-4 | BW-5 |
|---|---|---|---|---|---|---|---|---|---|---|---|
| Glass, phr | 10 | 25 | 10 | 25 | 17.5 | 10 | 10 | 25 | 10 | 25 | 17.5 |
| Carbon black, phr | 0 | 0 | 25 | 25 | 12.5 | 0 | 0 | 0 | 25 | 25 | 12.5 |
| Silane, wt.% of glass | — | — | — | — | — | — | 2 | 2 | 2 | 2 | 2 |
| Shore hardness | 43 | 48 | 54 | 59 | 50 | 42 | 43 | 51 | 59 | 61 | 54 |
| Elongation, % | 336 | 342 | 645 | 633 | 593 | 485 | 410 | 253 | 478 | 559 | 464 |
| Tensile strength, psi | 135 | 142 | 1356 | 1361 | 653 | 231 | 359 | 565 | 2067 | 2441 | 874 |
| Tensile modulus, psi | | | | | | | | | | | |
| at 100% elongation | 117 | 144 | 121 | 150 | 110 | 157 | 199 | 435 | 501 | 790 | 420 |
| at 300% elongation | 133 | 144 | 368 | 408 | 174 | 278 | 320 | — | 917 | 1008 | 642 |
| Tear strength lb/in | | | | | | | | | | | |
| across grain | 37.3 | 42.2 | 62.5 | 66.0 | 46.9 | 58.4 | 75.4 | 102.1 | 150.3 | 173.7 | 135.0 |
| with grain | 27.6 | 27.6 | 79.8 | 66.6 | 41.0 | 52.8 | 53.7 | 68.5 | 151.6 | 154.7 | 116.9 |
| Modulus of compression, psi | 1333 | 1887 | 2290 | 3818 | 2066 | 1131 | 1072 | 1888 | 2430 | 3755 | 2030 |

Table II below illustrates the effect of silane on the various properties. Isolated here are runs BW-0 and BW-1 which are identical except for the presence of the silane:

TABLE II

| Run No. | BW-0 | BW-1 | % Change |
|---|---|---|---|
| Silane, wt.% of glass | none | 2 | — |
| Shore hardness | 42 | 43 | +2 |
| Elongation, % | 485 | 410 | −15 |
| Tensile strength, psi | 231 | 359 | +55 |
| Tensile modulus, psi | | | |
| at 100% elongation | 157 | 199 | +27 |
| at 300% elongation | 278 | 320 | +15 |
| Tear strength, lb/in | | | |
| across grain | 58.4 | 75.4 | +29 |
| with grain | 52.8 | 53.7 | +2 |

Table III below compares the chopped strand (runs CS-2 and CS-4) and the B wool (runs BW-2 and BW-4) with commercial glass beads (type 3000, Potter Industries, Carlstadt, N.J.; runs labelled "GB") as fillers:

TABLE III

| Run No. | CS-2 | CS-4 | GB-1 | GB-2 | BW-2 | BW-4 |
|---|---|---|---|---|---|---|
| Chopped glass strand, phr | 25 | 25 | — | — | — | — |
| 44μ glass beads, phr | — | — | 25 | 25 | — | — |
| "B" glass wool, phr | — | — | — | — | 85 | 25 |
| Carbon black, phr | — | 25 | — | 25 | — | 25 |
| Shore hardness | 48 | 59 | 43 | 59 | 51 | 61 |
| Elongation, % | 342 | 633 | 438 | 547 | 253 | 559 |
| Tensile strength, psi | | | | | | |
| longitudinal | 142 | 1361 | 241 | 1894 | 565 | 2241 |
| transverse | — | — | 255 | 1815 | 360 | 1771 |
| Tensile modulus, psi | | | | | | |
| at 100% elongation | 144 | 150 | 128 | 263 | 435 | 790 |
| at 300% elongation | 144 | 408 | 202 | 751 | — | 1008 |
| Tear strength, lb/in | | | | | | |
| across grain | 42.2 | 66.0 | 48.1 | 127.7 | 102.1 | 173.7 |
| with grain | 27.6 | 66.6 | 48.5 | 123.4 | 68.5 | 154.7 |

Table IV below is a similar comparison to that of Table III but compares the chopped strand and B wool to conventional asbestos fiber reinforcements, all at 25 phr. The three types of asbestos fibers used were grades 3T, 5K, and 7T. "AF" designates the asbestos fiber runs.

TABLE IV

| Run No. | AF-1 | AF-2 | AF-3 | AF-4 | AF-5 | AF-6 | CS-2 | CS-4 | BW-2 | BW-4 |
|---|---|---|---|---|---|---|---|---|---|---|
| Asbestos QAMA grade | 3T | 3T | 5K | 5K | 7T | 7T | — | — | — | — |
| Carbon black, phr | — | 25 | — | 25 | — | 25 | — | 25 | — | 25 |
| Shore hardness | 60 | 70 | 61 | 69 | 52 | 62 | 48 | 59 | 51 | 61 |
| Elongation, % | 110 | 479 | 243 | 539 | 451 | 557 | 342 | 633 | 253 | 559 |
| Tensile modulus, psi | 269 | 1050 | 257 | 1357 | 190 | 1366 | 142 | 1361 | 565 | 2241 |
| at 100% elongation | 270 | 342 | 242 | 281 | 122 | 172 | 144 | 150 | 435 | 790 |
| at 300% elongation | — | 538 | — | 541 | 149 | 490 | 144 | 408 | — | 1008 |
| Tear strength, lb/in | | | | | | | | | | |
| across grain | 82.0 | 104.8 | 76.4 | 101.2 | 42.6 | 66.0 | 42.2 | 66.0 | 102.1 | 173.7 |
| with grain | 59.7 | 103.1 | 55.9 | 80.5 | 37.3 | 62.3 | 27.6 | 66.6 | 68.5 | 154.7 |
| Modulus of compression, psi | 2357 | 5162 | 2990 | 5204 | 1910 | 2794 | 1887 | 3818 | 1888 | 3755 |

Table V below illustrates the superiority of the fine diameter glass fibers over chopped strand in a variety of different rubber matrices.

ment value. Even if the elastomeric composition is made up using the continuous filaments or fabric without milling, subsequent cutting of the composition into

TABLE V

| Run No. | EP-1 | EP-2 | ES-1 | ES-2 | SS-1 | SS-2 | NR-1 | NR-2 |
|---|---|---|---|---|---|---|---|---|
| Rubber component, type[a] | EPDM (peroxide cured) | EPDM | EPDM (sulfur cured) | EPDM | natural rubber (smoked sheet) | | nitrile rubber | |
| Glass component, type[b] | CS | BW | CS | BW | CS | BW | CS | BW |
| Glass component, phr | 50 | 50 | 50 | 50 | 50 | 50 | 50 | 50 |
| Shore hardness | 63 | 62 | 55 | 59 | 45 | 50 | 58 | 56 |
| Elongation, % | 80 | 82 | 407 | 155 | 570 | 534 | 690 | 856 |
| Tensile strength, psi | 473 | 473 | 250 | 291 | 1151 | 1663 | 440 | 636 |
| Yield strength, psi | 483 | 483 | 214 | 323 | — | — | — | 267 |
| Tensile modulus, psi | | | | | | | | |
| at 100% elongation | — | — | 207 | 305 | 278 | 420 | 269 | 257 |
| at 300% elongation | — | — | 215 | — | 457 | 727 | 275 | 267 |
| Tear strength, lb/in | | | | | | | | |
| across grain | 77.6 | 82.7 | 66.0 | 82.1 | 93.5 | 113.5 | 105.9 | 109.1 |
| with grain | 48.6 | 50.1 | 49.0 | 61.0 | 74.2 | 100.4 | 75.4 | 79.7 |

Notes:
[a]EPDM (peroxide cured) was "Nordel 1040", ethylene-propylene-diene rubber, cured with dicumyl peroxide (40% active)
EPDM (sulfur cured) was "Nordel 1040", ethylene-propylene-diene rubber, cured with sulfur
Natural rubber was No. 1 smoked sheet
Nitrile rubber was "Hycar 1042" medium-high acrylonitrile content acrylonitrile-butadiene rubber
[b]"CS" is chopped strand
"BW" is B glass wool, containing 1% silane Table VI below illustrates high loadings of fine diameter glass fiber in a nitrile rubber matrix. While properties are satisfactory over the entire concentration range of 5 to 150 phr glass fibers, it is difficult to incorporate more than 50 phr of fiber into a rubber matrix. Since quite satisfactory properties are obtained at 50 phr or less, as shown above, the preferred fiber concentration is 5 to 50 phr.

such articles as gaskets reduces the reinforcing nature of the filaments or fabric. The short fine diameter fiber reinforced elastomeric compositions of the invention, however, can be milled, molded and cut with no significant degredation in reinforcement.

It has been found that longer cure times for the rubbers are needed when using the glass wool of the present invention, as compared to the cure times for asbes-

TABLE VI

| Run No. | AF-7 | BW-6a | BW-6b | BW-6c | BW-7a | BW-7b | BW-7c | BW-8a | BW-8b | BW-8c | BW-9a | BW-9b |
|---|---|---|---|---|---|---|---|---|---|---|---|---|
| Reinforcement, type[a] | 7TF | BW | BW | BW | BW | BW | BW | BW | BW | BW | BW | BW |
| Reinforcement, phr[b] | 100 | 106 | 106 | 106 | 106 | 106 | 106 | 130 | 130 | 130 | 100 | 100 |
| FEF Carbon black, phr | 29.4 | 29.4 | 29.4 | 29.4 | 40.0 | 40.0 | 40.0 | 29.4 | 29.4 | 29.4 | 55.0 | 55.0 |
| Silane, wt. % of glass | — | 0.53 | 0.53 | 0.53 | 0.53 | 0.53 | 0.53 | 0.65 | 0.65 | 0.65 | 0.50 | 0.50 |
| Cure time, minutes | 15 | 15 | 30 | 60 | 15 | 30 | 60 | 15 | 30 | 60 | 15 | 30 |
| Shore hardenss | 88 | 83 | 88 | 89 | 85 | 88 | 90 | 84 | 89 | 90 | 89 | 91 |
| Elongation, % | 110 | 132 | 57 | 52 | 141 | 36 | 30 | 139 | 56 | 34 | 120 | 51 |
| Tensile strength, psi | 2162 | 1127 | 1614 | 2089 | 1494 | 1788 | 2335 | 1125 | 1606 | 2018 | 1652 | 2229 |
| Tensile modulus, psi | | | | | | | | | | | | |
| at 100% elongation | 2051 | 1013 | — | — | 1245 | — | — | 1009 | — | — | 1483 | — |
| Average tear strength, lb/in | 244 | 178 | 213 | 229 | 192 | 206 | 250 | 169 | 210 | 232 | 226 | 223 |

Notes:
[a]"7TF" means asbestos fiber, 7TF grade
"BW" means B glass wool

From all of the above data it will be immediately evident that the elastomeric materials reinforced with the fine diameter short glass fibers of the present invention are much superior to similar compositions containing equivalent amounts of chopped strand glass fibers of much coarser "reinforcing" diameter, or conventional glass bead fillers. The fine diameter fibers of this invention provide reinforcement equal to or better than that of conventional asbestos fibers. This is particularly surprising in view of the fact that the prior art has not heretofore considered fine short glass fibers to have any reinforcing properties whatsoever.

It will also be noted from the above data that when carbon black is present, significant increases are found in strength properties.

The use of fine diameter short glass fibers also overcomes many of the problems associated with the formation of elastomeric materials reinforced with continuous glass filaments or woven glass fabrics. Milling or compounding of compositions cannot be done with fabric reinforcement, for the milling destroys the integrity of the fabric. Similarly, milling also breaks up the continuous filaments, substantially reducing their reinforcetos fiber reinforced elastomers. This is believed to be due to the fact that asbestos fiber has a somewhat catalytic effect on the elastomer and hastens the cure, whereas the glass fiber has no such effect. Consequently, a longer cure time at the same temperature is required for the glass fiber reinforced material. Alternatively, higher cure temperatures may be used for the same length of time. It should be noted that cure times and temperature with the glass fibers are equivalent to those required with unfilled rubber; the asbestos fibers effectively accelerate the normal cure cycle.

What is claimed is:

1. A composition of matter comprising an elastomeric matrix of natural or synthetic rubber reinforced with 5 to 150 phr of glass fibers having diameters in the range of 0.5 to 3.8 microns and lengths in the range of 3 to 50 mm.

2. The composition of claim 1 wherein said glass fibers are present in a concentration of 5 to 50 phr.

3. The composition of claim 1 wherein said glass fibers are diameters in the range of 2.5 to 3.8 microns.

4. The composition of claim 1 wherein said glass fibers are coated with a coupling agent.

5. The composition of claim 4 wherein said coupling agent is an organosilane.

6. The composition of claim 5 wherein said organosilane is present in a concentration of 0.25 to 3.0 percent by weight of glass fiber.

7. The composition of claim 6 wherein said organosilane is present in a concentration of 0.5 to 1.0 percent by weight of glass fiber.

8. The composition of claim 1 further comprising 5 to 75 phr of carbon black.

9. The composition of claim 8 wherein said carbon black is present as 5 to 35 phr.

10. The composition of claim 2 further comprising 5 to 75 of carbon black.

11. The composition of claim 10 wherein said carbon black is present as 5 to 35 phr.

12. The composition of claim 10 wherein said glass fibers are coated with an organosilane.

13. The composition of claim 12 wherein said organosilane is present as 0.25 to 3.0 percent by weight of glass fibers.

* * * * *

UNITED STATES PATENT AND TRADEMARK OFFICE
CERTIFICATE OF CORRECTION

PATENT NO. : 4,048,137
DATED : September 13, 1977
INVENTOR(S) : Glenn Alvin Heitmann It is certified that error appears in the above-identified patent and that said Letters Patent are hereby corrected as shown below:

Column 3, line 24, "dimeters" should read --diameters--.

Column 3, line 65, "gamm-methacryloxypropyltrimethoxysilane" should read --gamma-methacryloxypropyltrimethoxysilane--.

Column 5, line 8, "taken" should read --then--.

Table III, Column "BW-2" three down, "85" should read --25--.

Table III, line 3, "44μ" should read -- $^{-}$44μ --.

Column 10, line 4, Claim 10, following "75" insert --phr--.

Signed and Sealed this

Twenty-seventh Day of December 1977

[SEAL]

Attest:

RUTH C. MASON
*Attesting Officer*

LUTRELLE F. PARKER
*Acting Commissioner of Patents and Trademarks*